Aug. 31, 1965　　　J. A. HOWARD　　　3,203,702
FLAIL TYPE MATERIAL UNLOADER
Filed Jan. 8, 1964
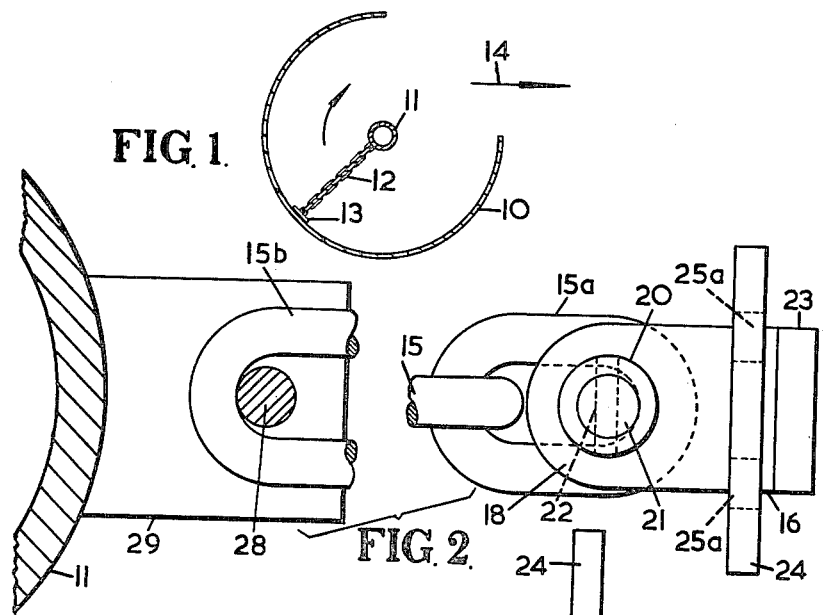
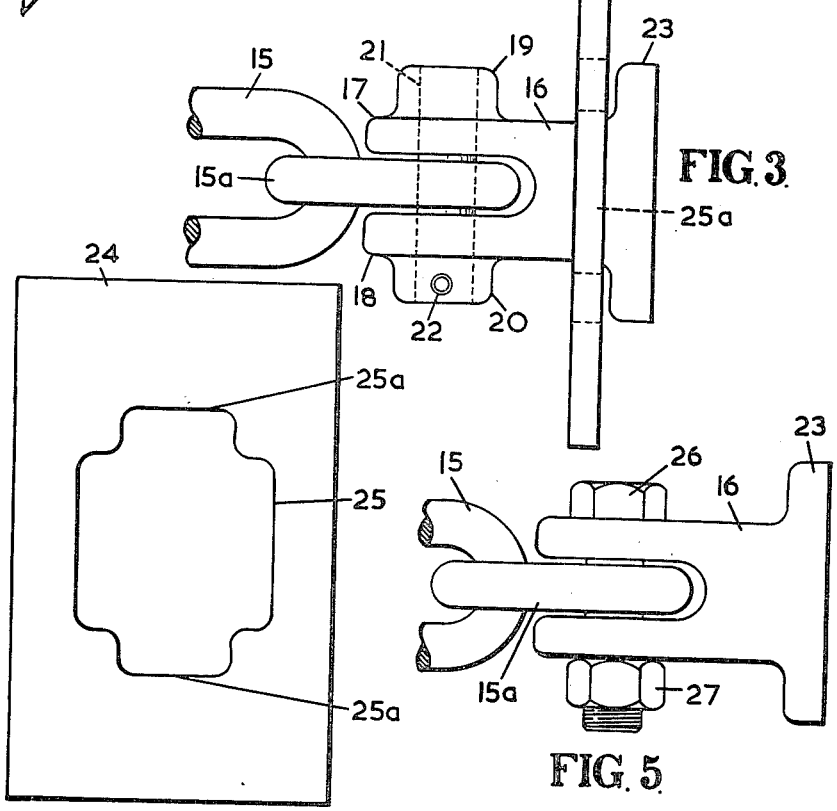

United States Patent Office 3,203,702
Patented Aug. 31, 1965

3,203,702
FLAIL TYPE MATERIAL UNLOADER
John Arthur Howard, West Horndon, England, assignor to Rotary Hoes Limited, West Horndon, England
Filed Jan. 8, 1964, Ser. No. 336,582
Claims priority, application Great Britain, Jan. 14, 1963, 1,674
8 Claims. (Cl. 275—3)

The invention relates to a material unloading implement such, for example, as a manure spreader, of the kind including a receptacle which is generally of cylindrical cross-section but has an open side of which flails, which are supported at their inner ends in axially spaced relationship from a drivable shaft coaxially within the receptacle, are adapted, by the the action of centrifugal force, for means at their outer ends to discharge, in a spreading manner, material from within the receptacle. In the use of such an implement the means at the outer ends of the flails are moved to be close to the drivable shaft when the latter is first rotated for the purpose of discharging material from within the receptacle, the centrifugal action on the said means constraining them to act at an increasing distance from the axis from the shaft as the material is discharged. The nature of the material may be such as to have an undesirably high erosion effect on the said means, or, according to the nature of the material to be discharged, it may be desirable for said means to have a different shape or size. The object of the invention is a construction of the said means and flail which will enable said means, alone, to be substituted either when wear takes place, or when the shape or size is inappropriate, instead of it being necessary to replace the whole flail.

According to the invention the means on the outer end of each flail is in the form of a member having a stem adapted to be secured detachably to the said other end of the flail and to extend through a hole of a drag member for acting on the material, the drag member being held on the stem against centrifugal separation by an abutment of the stem, and in the other direction by the means securing the stem to the flail.

According to a feature of the invention the stem of the member has an inner end which is bifurcated to straddle the outer end of the flail, and the said outer end of the latter has a transverse through-hole to accommodate a pin detachably held in position to bridge the bifurcated portions of the stem.

According to a further feature the end of the member remote from the flail has a lateral abutment for restraining the drag member against removal from the stem by centrifugal force.

In such a case, and according to a further feature, the lateral abutment extends to two opposite sides of the stem parallely to the axis of the shaft.

According to another feature the drag member is a plate of rectangular outline and having a central hole which is of the same cross-sectional shape as the stem but sufficiently larger as to permit the plate to slide axially on the stem.

In such a case, and according to yet another feature, the stem, and the central hole of the drag plate, are non-circular so as to prevent their relative rotation about the axis of the stem.

In the accompanying drawings:
FIGURE 1 is a cross-sectional diagram of the relevant portion of a manure spreader, of the kind set forth, to which the present improvements are applicable;
FIGURE 2 is a view of a flail, in the axial direction of the driving shaft and with a central portion broken away, showing one form of exchangeable spreading means in accordance with the invention at the outer end;
FIGURE 3 is a plan view of the spreading means shown in FIGURE 2;
FIGURE 4 is an elevation of the drag member shown in FIGURES 2 and 3; and
FIGURE 5 is a view which is similar to FIGURE 3 but shows a modified construction.

The known form of manure spreader diagrammatically illustrated by FIGURE 1 includes a generally cylindrical receptacle 10 for the manure, in which is coaxially journalled a driven shaft 11. The shaft supports a plurality of flails 12 having drag members 13 at their outer ends, and the arrangement is such that when the shaft is driven clockwise in the figure, while the receptacle is full, the flails fly out centrifugally to work on the manure and fling it out of an open side of the container as indicated by the arrow 14. As previously stated the drag members 13 are subject to a high rate of wear, and the object of the invention is to enable them to be exchanged readily with a minimum wastage of metal.

In FIGURES 2 to 4, in which the flail is in the form of a chain 15, the member of the invention has a stem 16 which is of rectangular cross-section and is bifurcated to form a pair of jaws 17, 18 to straddle the outer link 15a of the flail, the jaws being provided with bosses 19 and 20 and aligned through-holes through which, and the hole of the link, extends a pivot pin 21 held in position by a set pin 22. At its end remote from the connection to the flail, the stem is provided with a rectangular head 23 which serves as an abutment to retain the exchangeable drag member against centrifugal force.

The drag member, as best seen from FIGURE 4, is in the form of a rectangular plate 24 having a central cruciform hole 25 which is a clearance fit on the stem 16 and has lateral enlargements 25a providing clearance for the outer link 15a. The plate 24 is preferably arranged such that its longer dimension is parallel to the axis of the shaft, and the engagement of its cruciform hole on the rectangular cross-sectioned stem 16 prevents relative rotation.

In the modification shown in FIGURE 5 the bosses 19 and 20 are omitted, and a bolt 26 with a nut 27 which can be held against turning by a split pin (not shown) takes the place of pivot pin 21 and set pin 22.

In either case the inboard link 15b of the flail is pivotally secured by a pin 28 extending between a pair of parallel cheeks 29 welded or otherwise secured to the shaft 11.

The initial rotation of the shaft will wind the flails thereabout, and continued rotation of the shaft will cause the drag plates to remove the material, from within the mass thereof in the receptacle, and to throw it centrifugally through the open side of the receptacle. As the material is delivered in this way the flails become unwound from the shaft by centrifugal force and bite deeper into the material until all of the latter will have been delivered. Obviously, the flails are of such length, that when all the material will have been delivered, they will not engage the peripheral wall of the receptacle.

It will be seen that if any one of the drag plates becomes worn, or if it is of a wrong size or shape to deal efficiently with the material to be delivered, all that is necessary is for the stem of the member to be detached from the outer end of the flail, as by removing the set pin 22 and pivot pin 21 of the construction shown in FIGURES 2 and 3, or the nut 27 and bolt 26 of FIGURE 4, for the existing plate 24 to be slid off the stem, and for the replacement plate to be slid thereon before re-attaching the stem to the flail.

What I claim as my invention and desire to secure by Letters Patent of the United States is:

1. An implement comprising a receptacle for material to be unloaded through a lateral opening of the receptacle, a shaft within said receptacle, a plurality of flails secured at one end to said shaft, respective drag members for said flails, and means for securing said drag members to the other ends of said flails, each said drag-member-securing means including a stem extending lengthwise of the flail through a hole in the associated drag member, means for detachably securing one end of each said stem to its associated flail, and lateral abutment means at the other end of each said stem, said securing means and said abutments spaced apart by an amount greater than the thickness of said drag members and providing stops for limiting sliding movement of said drag members along their associated stems.

2. An implement comprising a receptacle for material to be unloaded through a lateral opening of the receptacle, a shaft within said receptacle, a plurality of flails secured at one end to said shaft, respective drag members for said flails, and means for securing said drag members to the other ends of said flails, each said drag-member-securing means including a stem extending lengthwise of the flail through a hole in the associated drag member, one end of each said stem bifurcated to straddle its associated flail, respective pivot pins bridging the bifurcations and extending through respective transverse through-holes of the flails, said pivot pins being detachably held in position, and lateral abutment means at the other end of each said stem, said pivot pins and said abutments spaced apart by an amount greater than the thickness of said drag members and providing stops for limiting sliding movement of said drag members along their associated stems.

3. An implement comprising a receptacle for material to be unloaded through a lateral opening of the receptacle, a shaft within said receptacle, a plurality of flails secured at one end to said shaft, respective drag members for said flails, and means for securing said drag members to the other ends of said flails, each said drag-member-securing means including a stem extending lengthwise of the flail through a hole in the associated drag member, one end of each said stem bifurcated to straddle its associated flail, respective pivot pins bridging the bifurcations and extending through respective transverse through-holes of the flails, said pivot pins being detachably held in position, and lateral integral extensions at the other end of each said stem, said pivot pins and said lateral extensions spaced apart by an amount greater than the thickness of said drag members and providing stops for limiting sliding movement of said drag members along their associated stems.

4. An implement comprising a receptacle for material to be unloaded through a lateral opening of the receptacle, a shaft within said receptacle, a plurality of flails secured at one end to said shaft, respective drag members for said flails, and means for securing said drag members to the other ends of said flails, each said drag-member-securing means including a stem extending lengthwise of the flail through a hole in the associated drag member, one end of each said stem bifurcated to straddle its associated flail, aligned external bosses on each said stem at the bifurcation thereof, respective pivot pins supported in bores of said bosses to bridge the bifurcations and to extend through respective transverse through-holes of the flails, said pivot pins being detachably held in position, and lateral abutment means at the other end of each said stem, said bosses and said abutments spaced apart by an amount greater than the thickness of said drag members and providing stops for limiting sliding movement of said drag members along their associated stems.

5. An implement comprising a receptacle for material to be unloaded through a lateral opening of the receptacle, a shaft within said receptacle, a plurality of flails secured at one end to said shaft, respective rectangular drag plates for said flails, and means for securing said drag plates to the other ends of said flails, each said drag-member-securing means including a stem extending lengthwise of the flail through a hole in the associated drag plate, one end of each said stem bifurcated to straddle its associated flail, aligned external bosses on each said stem at the bifurcation thereof, respective pivot pins supported in bores of said bosses to bridge the bifurcations and to extend through respective transverse through-holes of the flails, said pivot pins being detachably held in position, and lateral abutment means at the other end of each said stem, said bosses and said abutments spaced apart by an amount greater than the thickness of said drag members and providing stops for limiting sliding movement of said drag plates along their associated stems.

6. An implement comprising a receptacle for material to be unloaded through a lateral opening of the receptacle, a shaft within said receptacle, a plurality of flails secured at one end to said shaft, respective drag members for said flails, and means for securing said drag members to the other ends of said flails, each said drag-member-securing means including a stem extending lengthwise of the flail through a hole in the associated drag member, one end of each said stem bifurcated to straddle its associated flail, respective pivot pins bridging the bifurcations and extending through respective transverse through-holes of the flails, said pivot pins being detachably held in position, and lateral abutment means at the other end of each said stem, the cross-section of said stem and the through-holes of said drag members being of corresponding non-circular shape so as to prevent relative rotation between each stem and its associated drag member, and said pivot pins and said abutments spaced apart by an amount greater than the thickness of said drag members and providing stops for limiting sliding movement of said drag members along their associated stems.

7. A manure spreader comprising a receptacle for manure to be unloaded through a lateral opening of the receptacle, a shaft within said receptacle, a plurality of chain flails secured at one end to said shaft, respective rectangular drag plates for said flails, and means for securing said drag plates to the other ends of said flails, each said drag-member-securing means including a stem of rectangular cross-section extending lengthwise of the flail through a rectangular hole in the associated drag plate, one end of each said stem bifurcated to straddle the chain link at the said other end of its associated flail, respective headed bolts bridging the bifucations and extending through the respective said chain links, respective nuts on said bolts to hold them detachably in position, and lateral abutment means at the other end of each said stem, the heads of said bolts and said nuts and said abutments spaced apart by an amount greater than the thickness of said drag members and providing stops for limiting sliding movement of said drag plates along their associated stems.

8. A manure spreader comprising a receptacle for manure to be unloaded through a lateral opening of the receptacle, a shaft within said receptacle, a plurality of chains flails secured at one end to said shaft, respective rectangular drag plates for said flails, and means for securing said drag plates to the other ends of said flails, each said drag-member-securing means including a stem of rectangular cross-section extending lengthwise of the flail through a rectangular hole in the associated drag plate, one end of each said stem bifurcated to straddle the chain link at the said other end of its associated flail, aligned external bosses on each said stem at the bifurcation thereof, respective pivot pins supported in bores of said bosses to bridge the bifurcations and to extend through the respective said chain links, means for detachably locking said pivot pins in said bosses, and lateral abutment means at the other end of each said stem, said bosses and said abutments spaced apart by an amount greater than the thickness of said drag members and providing stops for limiting sliding movement of said drag plates along their associated stems.

References Cited by the Examiner

UNITED STATES PATENTS

| | | | |
|---|---|---|---|
| 2,306,983 | 12/42 | Schutte et al. | 241—197 |
| 2,886,332 | 5/59 | Elwick | 275—3 |

FOREIGN PATENTS

| | | |
|---|---|---|
| 345,561 | 3/31 | Great Britain. |

ABRAHAM G. STONE, *Primary Examiner.*